Dec. 13, 1938.   W. RABKIN   2,140,332
STRENGTH TESTING MACHINE
Filed Jan. 9, 1937   4 Sheets-Sheet 1

INVENTOR
WILLIAM RABKIN
BY
ATTORNEY

Dec. 13, 1938.  W. RABKIN  2,140,332
STRENGTH TESTING MACHINE
Filed Jan. 9, 1937 4 Sheets-Sheet 2

INVENTOR
WILLIAM RABKIN
BY
ATTORNEY

Dec. 13, 1938. W. RABKIN 2,140,332
STRENGTH TESTING MACHINE
Filed Jan. 9, 1937 4 Sheets-Sheet 3
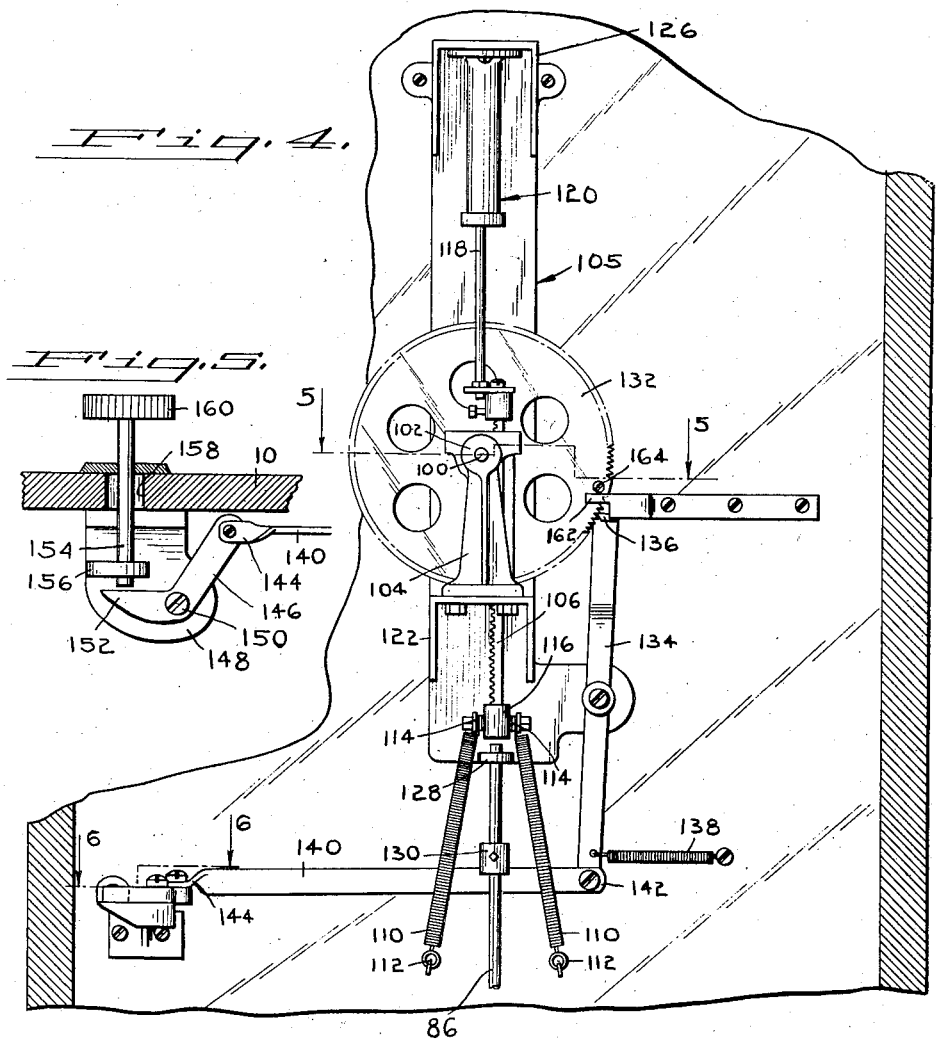
Fig. 4.
Fig. 5.
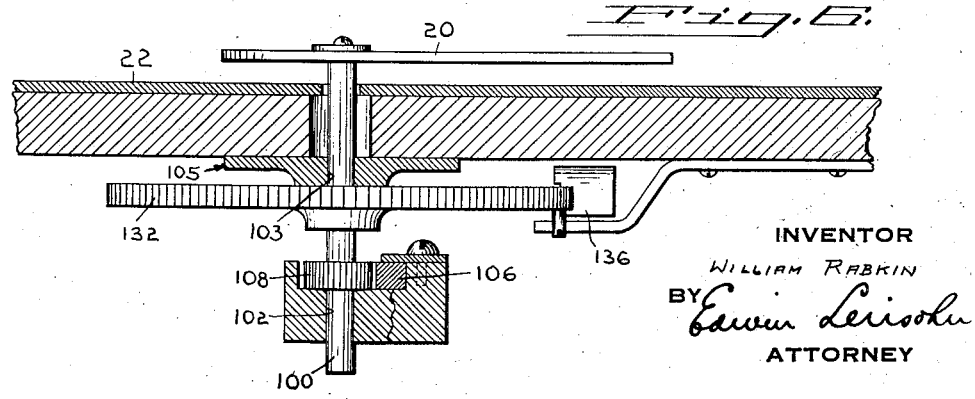
Fig. 6.
INVENTOR
WILLIAM RABKIN
BY
ATTORNEY Dec. 13, 1938.   W. RABKIN   2,140,332
STRENGTH TESTING MACHINE
Filed Jan. 9, 1937   4 Sheets-Sheet 4

INVENTOR
WILLIAM RABKIN
BY Edwin Levisohn
ATTORNEY

Patented Dec. 13, 1938

2,140,332

UNITED STATES PATENT OFFICE 2,140,332

STRENGTH TESTING MACHINE

William Rabkin, New York, N. Y.

Application January 9, 1937, Serial No. 119,781

17 Claims. (Cl. 265—20)

The present invention relates to strength testing machines.

One of the objects of the present invention is to provide a strength testing machine which is rugged in construction and reliable in operation whereby to fully meet the requirements of municipal and other government authorities for machines used in the physical examination of candidates for certain civil service positions, as for example, those of policemen and firemen.

Another object of the invention is the provision of a series of machines for testing the strength of various parts of the body.

A further object of the invention is to provide for the maximum standardization of parts so that to a considerable extent at least parts of similar construction may be utilized in any one of the series of machines for testing the strength of various parts of the body.

Another object of the invention is to provide means for improving the accuracy of the indicating mechanism of the machines.

Another object of the invention is to protect the indicating mechanism against shock in its operation by the rugged mechanism actuated during the operation of the machine in testing the subject's strength.

A yet further object of the invention is generally to improve the construction and operation of strength testing machines with special reference to their simplicity of construction and reliability of operation.

The above objects of the invention and other objects which might hereinafter appear will be fully understood from the following description considered with reference to the accompanying drawings forming a part of the present specification.

In the drawings:

Fig. 3a is a detail view in elevation of certain parts shown in Fig. 3;

Fig. 4 is a rear view of the mechanism in the upper part of the cabinet;

Figures 8, 9, 10:
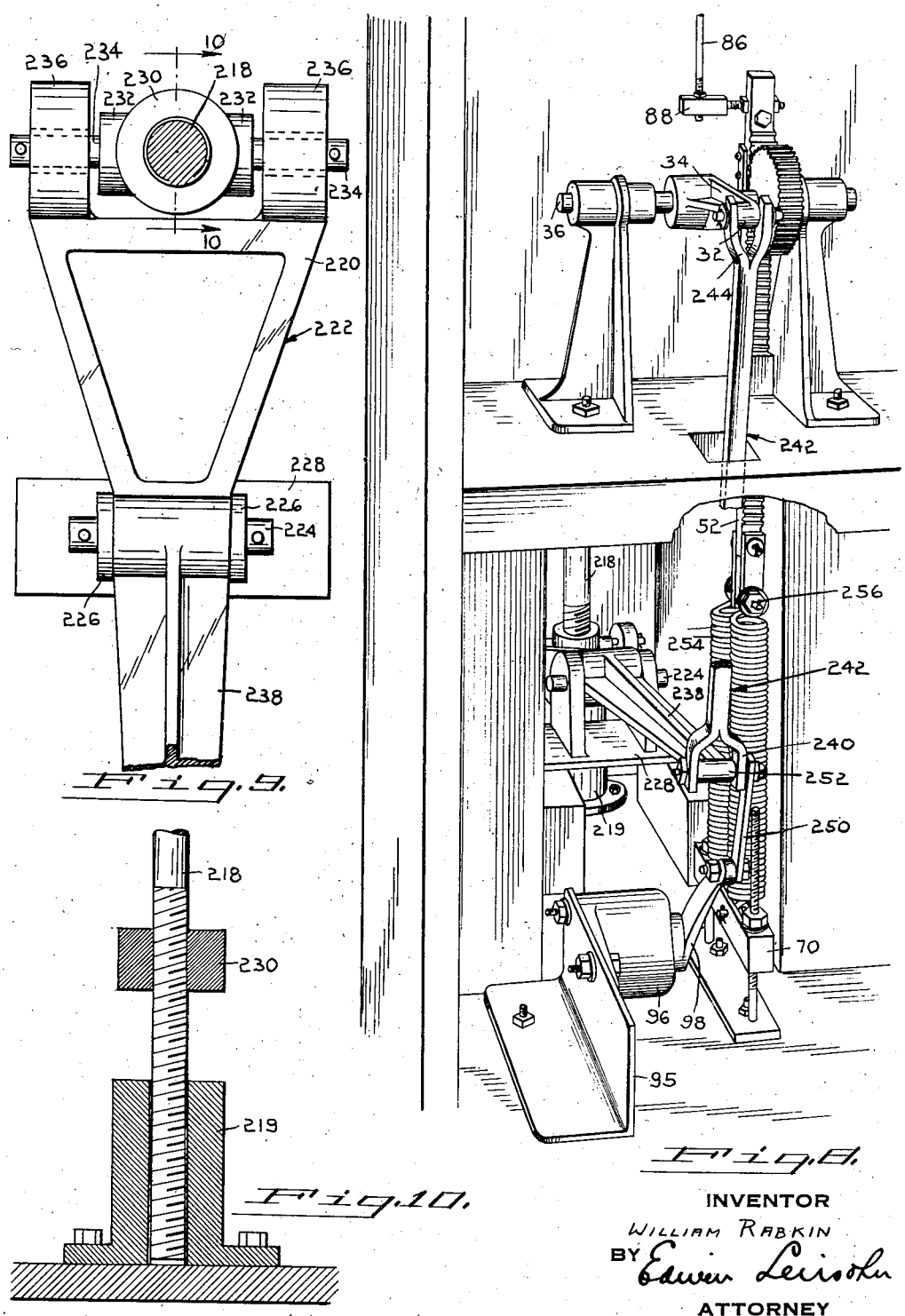

Figs. 5 and 6 are detail sectional views on the lines 5—5 and 6—6, respectively, of Fig. 4;

Fig. 7 is a perspective view of another machine embodying the present invention;

Fig. 8 is a rear perspective view of the mechanism in the lower part of the cabinet of the machine shown in Fig. 7;

Fig. 9 is a plan view partly in section of part of the mechanism illustrated in Fig. 8;

Fig. 10 is a detail sectional view on the line 10—10 of Fig. 9.

Figures 1, 2:
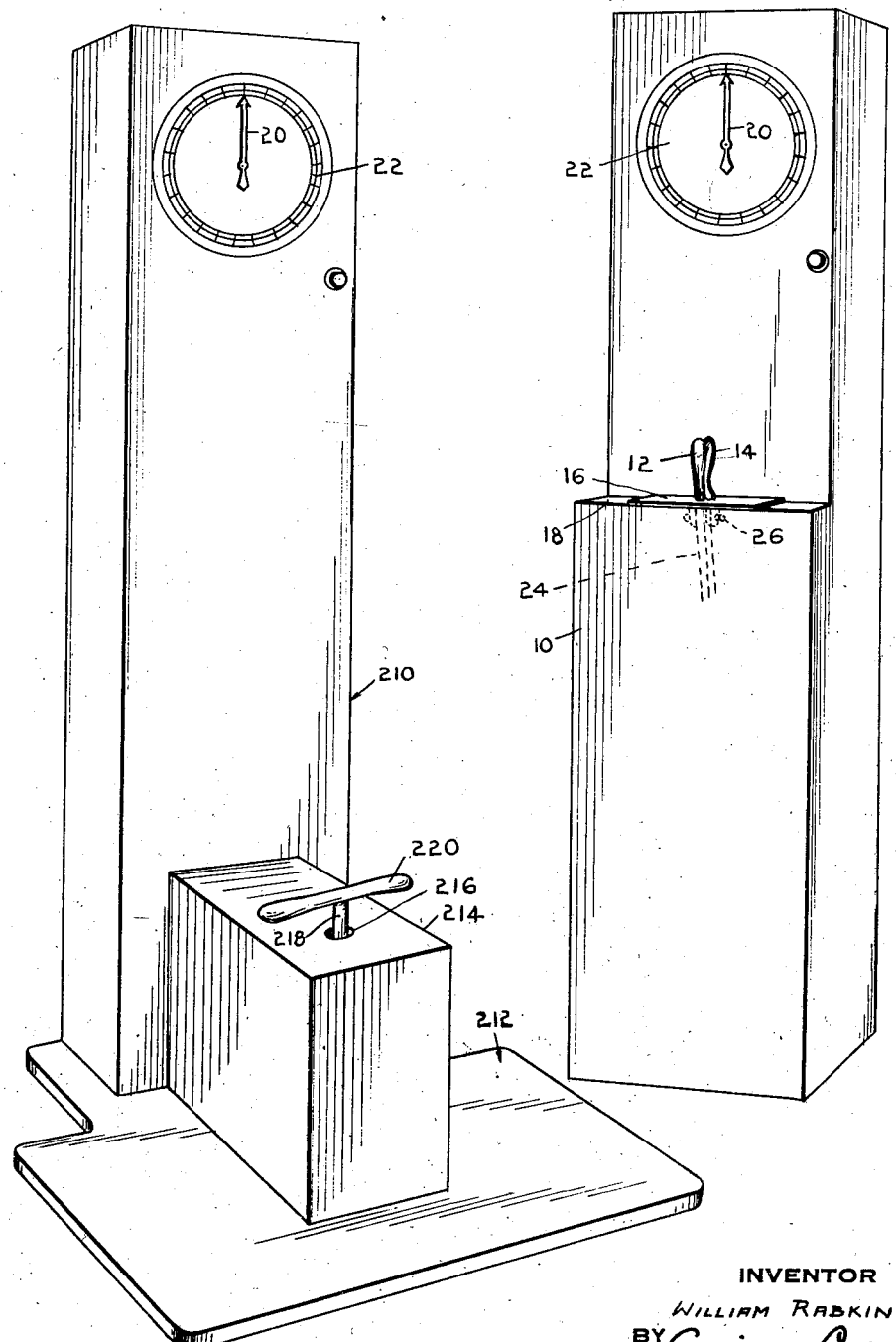
Fig. 1 is a perspective view of a strength testing machine embodying the present invention.
Fig. 2 is a rear perspective view of the mechanism in the lower part of the cabinet shown in Fig. 1.

Referring to the drawings in detail, and first to the machine illustrated in Fig. 1, it is seen that the latter comprises a cabinet 10 on which are mounted relatively movable hand gripping members here shown as a movable member 12 and a stationary member 14 carried by a plate 16 secured to a horizontal portion 18 of the cabinet. The gripping strength of the subject's hand is indicated by a pointer 20 movable over a dial 22 positioned at the front upper part of the cabinet. Said dial is suitably calibrated in units of any desired character, and preferably as here shown, in percentages of normal gripping strength.

The movable hand-grip member 12 is a manually engageable part of a pivoted lever 24 mounted on a horizontal pivot 26 carried by the plate 16. The lower end 28 of the arm of lever 24 below pivot 26 is connected by means of a link 30 to the upper end 32 of a lever 34 fixed to a horizontal shaft 36. Said shaft is journalled at its ends in bearings 38 and 40 formed in the upper ends of standards 42 and 44, respectively, mounted and secured to a support 46 extending across the cabinet 10. A pinion gear 48 is fixed to the shaft 36 adjacent the standard 44 and meshes with a rack 50 carried by a vertically disposed member 52 which extends through an opening 54 in the support 46 and is guided for vertical movement in an upper guide member 56 and in a lower guide member 58, both formed integrally with the standard 44. Plates 60 and 62 are removably secured to the guides 56 and 58, respectively, to permit the insertion and removal of the rack-carrying member 52. The lower end of the movable member 52 is connected by means of bars 64 to the upper end 66 of a strong spring 68. Said spring 68 constitutes resistance means which opposes the movement of member 52 by the mechanism actuated by the lever 24. The lower end of said spring is connected by means of a pin 70 to a block 78 adjustably mounted on screw-threaded rods 80 fixed to a plate 82 rigidly secured to the bottom of the cabinet. Said block 78 is maintained in adjusted position by nuts 84. The upper end of the movable rack-carrying member 52 is connected to a rod 86 by a plate 88 fastened thereto and to a bolt 90 secured to the upper end of the member 52.

Figure 3:
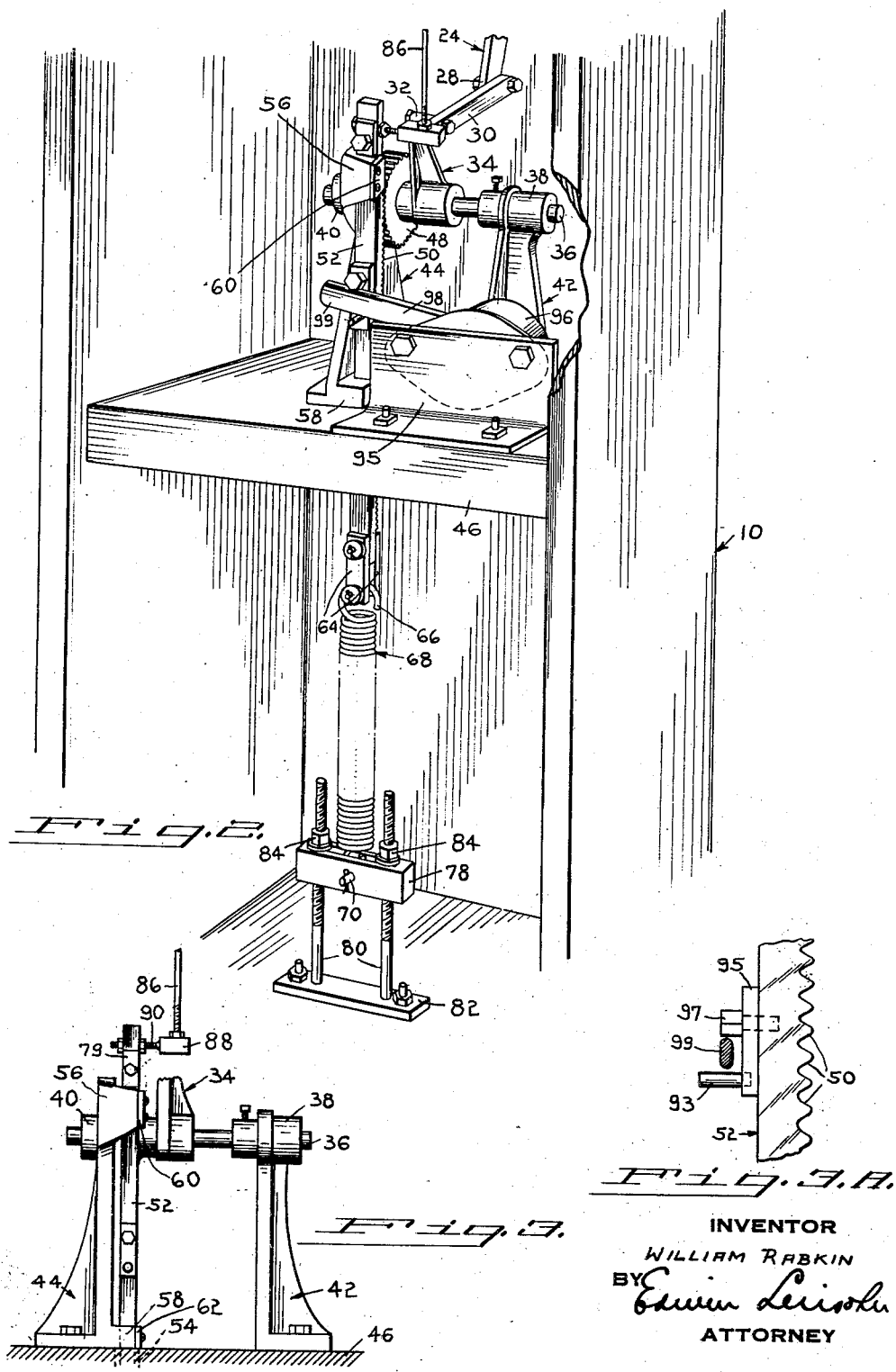
Fig. 3 is a rear view in elevation of part of the mechanism shown in Fig. 2.

The operation of the parts thus far described is relatively simple and is as follows: Normally, when the parts of the machine thus far described are at rest, the spring 68 maintains the movable member 52 in retracted position. When the machine is operated by actuating the hand-grip member 12 of lever 24, the lever 34 is caused to rotate the shaft 36. The rotation of shaft 36 causes the pinion 48 by engagement with the rack 50 of the member 52 to move the latter upwardly against the tension of the spring 68 and thereby actuates rod 86. When the lever 24 is released by the subject the spring 68 returns the member 52 to retracted position. As said spring is very strong, its action in returning said member 52 to retracted position and the rest of the mechanism to initial position may result in considerable shock to the mechanism. To obviate this difficulty, provision is made for retarding and cushioning return movement of the member 52 and the parts associated therewith. The means for this purpose comprises as here shown a hydraulic shock absorber 96 mounted on a supporting plate 95 and having a rigid movable arm 98 connected at its end 99 to the movable member 52. As shown more clearly in Fig. 3a, the end portion 99 of the shock absorber 98 is received between a pin 93 fixed to a plate 95 and the head of a bolt 97 by which said plate is fastened to the member 52. The return movement of member 52 is limited by a stop plate 79 bolted to the upper end of said member in position to engage the top edge of the guide 56 when member 52 reaches retracted position. Said shock absorber 96 not only prevents shock and damage to the machine by preventing a too rapid return of the member 52 to retracted position, but also opposes a rapid movement of said member to projected position and thereby eliminates or greatly reduces the factor of momentum in the actuation of said movable member. By thus greatly reducing, if not eliminating entirely the factor of momentum in the operation of the machine a more accurate indication of the subject's strength is obtained than if the subject were permitted to take advantage of the factor of momentum in the operation of the machine.

The manner in which the indicating mechanism, including the pointer 20 is actuated will now be described, reference being had more particularly to Figs. 4 to 6. The pointer 20 is fixed to the forward end of the rotatable shaft 100 which is journalled in a bearing 102 at the upper end of a standard 104 and in a bearing 103 formed in a plate 105 secured to the cabinet wall. Said shaft is rotated by a rack 106 which meshes with a pinion 108 fixed to the shaft. The rack is normally held in retracted position by springs 110 fixed at their lower ends 112 to the front wall of the cabinet and at their upper ends 114 to a block 116 at the lower end of the rack. The upper end of said rack is connected to the piston rods 118 of a dash pot 120 whereby the momentum and inertia factors of the parts are prevented from affecting the movement of pointer 20. It will be observed that the standard 104 is supported on a shelf 122 formed on plate 105 and that the cylinder of the dash pot 120 is suspended from a similar shelf 126 of said plate. It will be observed also that the upper end of the rod 86 is movable through an apertured guide lug 128 formed at the lower end of plate 105 and that said rod 86 is provided with an adjustable stop member 130 which limits the upward movement of the rod and the corresponding movement of the rack 106.

As clearly shown in Fig. 4, when the movable member 52 and its associated part or rod 86 are in retracted position, the upper end of the rod is spaced from the block 116 of the rack 106 when the latter is in retracted position. Thus, a lost-motion connection is provided between the indicating mechanism and the operating mechanism of the machine. This permits the operating mechanism including the movable member 52 and rod 86 to return to retracted position independently of the return movement of the rack 106 and the rest of the indicating mechanism associated therewith. The lost-motion connection also contributes to the accuracy of the machine as the indicating mechanism is not subjected to the effect of any abrupt movement of the rod 86 which may occur at the initiation of the actuation of the operating mechanism against the force of the strong spring 68, although as indicated above, the tendency of the operating mechanism to abrupt and jerky motion is reduced considerably, if not entirely eliminated by the shock absorber 96.

In accordance with the present invention, provision is made for retaining the pointer releasably in indicated position so that the reading on the dial may be obtained after the subject has released the handle 12 and lever 24. For this purpose a releasable pawl and ratchet mechanism is provided, and as here shown (Figs. 4 and 5) comprises a relatively large ratchet wheel 132 fixed to the pointer operating shaft 100 and a pivoted pawl lever 134 having a detent 136 in engagement with the teeth of the ratchet wheel 132 and normally held in engagement therewith by a spring 138. It will be understood that the detent 136 permits the rotation of the shaft 100 when the latter is rotated by upward movement of the rack 106, but that said detent prevents movement of the shaft 100 in the opposite direction as when the rod 86 moves to retracted position. When, however, it is desired to permit the pointer to return to zero position, the detent 136 is released from engagement with the ratchet wheel 132 by suitable mechanism provided for that purpose. As here shown (Fig. 5), said releasing mechanism comprises a rod 140 pivotally connected at one end 142 to the lower end of the pawl lever 134 and pivotally connected at its other end 144 to one arm 146 of a bell crank lever pivotally mounted on a bracket 148 by a pivot screw 150. The other end 152 of the bell crank lever is arranged to be engaged by the end of a push rod 154 slidable in an apertured lug 156 of said bearing 148. Said push rod 154 projects through an opening 158 in the front wall of the cabinet 10 and is provided with a knob 160 which upon being pressed inwardly causes the rod 154 to actuate the bell crank lever and the rod 140 to release the detent 136 from engagement with the ratchet wheel 132. The movement of the pointer 20 to zero position is limited by the fixed stop member 162 which is disposed in the path of movement of a pin 164 carried by the ratchet wheel 132.

In Fig. 7 there is shown a machine for testing the lifting strength of the subject. As here shown, the cabinet 210 is mounted on a broad base 212 whereby said cabinet is supported in stable upright position without securing the base 212 to the floor. A compartment 214 is formed as part of the cabinet and houses part of the mechanism which will hereinafter be described. Said compartment is provided with a top opening 216 through which the rod 218 projects, said rod being provided with a handle 220. It will be understood that the lifting strength of the subject is tested when the latter pulls on the handle 220 against the force of the resistance of the mechanism within the cabinet and that as a result of the operation of the mechanism an indication of the lifting strength of the subject will be given by the pointer 20 on the dial 22.

The lifting rod 218 is guided for vertical movement in a cylindrical member 219 (Fig. 10) bolted to the floor of the cabinet, said rod being connected to one arm 220 of a lever 222 pivoted intermediate the ends thereof on a pivot pin 224 carried by upstanding lugs 226 of a bracket 228. Said arm 220 is pivotally connected to the lifting rod 218 by a sleeve 230 connected to said rod, for which purpose said rod and sleeve are screw-threaded. Said sleeve is provided with bosses 232 which are mounted on pivot pins 234 journalled in spaced apertured lugs 236 formed at the outer end of the lever arm 220. The other lever arm 238 is pivotally connected at its outer end to the lower end 240 of a rod 242. The upper end 244 of said rod is pivotally connected to the end 32 of lever 34 in the same manner as the link 30 of the hand-grip testing machine described above. Said lever has been designated by the same reference numerals and similarly the other parts of the mechanism directly associated with or operated by said lever have been designated by the same reference characters employed in the illustration of the machine shown in Fig. 1, as the machines are of the same construction and operation so far as these parts are concerned. It will be observed, however, that instead of connecting the arm 98 of the shock absorber 96 to the movable rack-carrying member 52, said shock absorber arm is connected by means of a link 250 to the pin 252 by which the outer end of the lever arm 238 is connected to the link 242. It will be observed also that the resistance to the movement of the rack-carrying member 52 is constituted by two springs 254 instead of one spring, the upper end of each spring being connected by a single pin 256 to the lower end of the rack-carrying member 52. The lower ends of said springs are connected to the adjustable block 70.

Thus, it is seen that the machines shown or described herein are well adapted to accomplish the several objects of the present invention. It will be understood, however, that the invention is capable of other embodiments and that in the embodiments shown certain changes in the construction and arrangement of parts may be made. Therefore, I do not wish to be limited precisely to the present disclosure or to any part thereof except as may be required by the appended claims.

Having thus described my invention, what I claim and desire to secure by Letters Patent is:

1. Apparatus of the class described comprising a member movable from retracted position to projected position, a yieldable resistance opposing the projection of said member, a rack carried by said member for moving the same, means including a gear meshing with said rack for projecting said member, manual means for actuating said projecting means, means for indicating the force exerted on said manual means for projecting said member, mechanism operated by said member for actuating said indicating means to move the latter in one direction from initial position thereof, comprising a rack movable from retracted position to projected position, said second rack in its retracted position having one end spaced from said member in the retracted position of the latter and operatively engageable by said member only after a limited movement thereof.

2. Apparatus of the class described comprising a member movable from retracted position to projected position, a yieldable resistance opposing the projection of said member, a rack carried by said member for moving the same, means including a gear meshing with said rack for projecting said member, manual means for actuating said projecting member, means for indicating the force exerted on said manual means for projecting said member, mechanism operated by said member for actuating said indicating means to move the latter in one direction from initial position thereof, comprising a rack movable from retracted position to projected position, said last mentioned rack in its retracted position having one end spaced from said member in the retracted position of the latter, operatively engageable by said member only after a limited movement thereof, and means for releasably holding said last mentioned rack in projected position while said member returns to retracted position.

3. Apparatus of the class described comprising a member movable from retracted position to projected position, a yieldable resistance opposing the movement of said member to projected position, means for projecting said member comprising a rotary shaft, a gear fixed to said shaft, and a rack carried by said member operable by said gear for projecting said member, a lever fixed to said shaft for rotating the latter, a pair of relatively movable hand-grip members one of which is fixed and the other of which is movable, said movable hand-grip member comprising a pivoted lever, and a link pivotally connected to said shaft rotating lever and to said hand-grip lever.

4. Apparatus of the class described comprising a cabinet having mounted therein a member movable from retracted position to projected position, a yieldable resistance opposing the movement of said member to projected position, means for projecting said member comprising a rotary shaft and a connection between said shaft and member for moving the latter when the shaft is rotated, a lever for rotating said shaft, a plate at the front of said cabinet, and a lever pivotally mounted on said plate, said last mentioned lever having a manually engageable part accessible externally of the cabinet and having an arm connected to said shaft rotating lever for actuating the latter.

5. Apparatus of the class described comprising a cabinet having mounted therein a member movable from retracted position to projected position, a yieldable resistance opposing the movement of said member to projected position, means for projecting said member comprising a rotary shaft and a connection between said shaft and member for moving the latter when the shaft is rotated, a lever for rotating said shaft, a horizontally disposed plate at the front of said cabinet, a vertically disposed lever pivotally mounted on said plate said last mentioned lever having a manually engageable part accessible externally of the cabinet and having an arm connected to said shaft rotating lever for actuating the latter.

6. Apparatus of the class described comprising a cabinet having mounted therein a member movable from retracted position to projected position, a yieldable resistance opposing the movement of said member to projected position, means for projecting said member comprising a rotary shaft and a connection between said shaft and member for moving the latter when the shaft is rotated, a lever fixed to said shaft for rotating the latter, said cabinet having a front horizontal wall portion provided with an opening, a vertically disposed member movably mounted in said cabinet and extending through said opening, and means connecting said vertically disposed member to said shaft operating lever for actuating the latter.

7. Apparatus of the class described comprising a cabinet having mounted therein a member movable from retracted position to projected position, a yieldable resistance opposing the movement of said member to projected position, means for projecting said member comprising a rotary shaft and a connection between said shaft and member for moving the latter when the shaft is rotated, a lever for rotating said shaft, said cabinet having a front horizontal wall portion provided with an opening, a vertically disposed member movably mounted in said cabinet and extending through said opening, a horizontally disposed lever pivotally mounted below said opening and having one end connected to said vertically disposed member, and means connecting the other end of said last mentioned lever to said shaft rotating lever for actuating the latter.

8. Apparatus of the class described comprising a cabinet having mounted therein a member movable from retracted position to projected position, a yieldable resistance opposing the movement of said member to projected position, means for projecting said member comprising a rotary shaft and a connection between said shaft and member for moving the latter when the shaft is rotated, a lever for rotating said shaft, said cabinet having a front horizontal wall portion provided with an opening, a vertically disposed member movably mounted in said cabinet and extending through said opening, and means connecting said vertically disposed member to said shaft operating lever for actuating the latter to project said first member, and means for retarding the movement of said first member to retracted position.

9. Apparatus of the class described comprising a cabinet having mounted therein a member movable from retracted position to projected position, a yieldable resistance opposing the movement of said member to projected position, means for projecting said member comprising a rotary shaft and a connection between said shaft and member for moving the latter when the shaft is rotated, a lever for rotating said shaft, said cabinet having a front horizontal wall portion provided with an opening, a vertically disposed member movably mounted in said cabinet and extending through said opening, a horizontally disposed lever pivotally mounted below said opening and having one end connected to said vertically disposed member, means connecting the other end of said last mentioned lever to said shaft rotating lever for actuating the latter to project said first member, and means connected to said last mentioned means for retarding the movement of said first member to retracted position.

10. Apparatus of the class described comprising manually engageable means movable for testing the strength of the operator of the apparatus, resistance opposed mechanism actuated by said manually engageable means, a dial and a movable pointer to indicate the force applied to said means in the actuation of said mechanism, means for actuating said pointer comprising a rotatable shaft to which said pointer is fixed, means operable under the control of said mechanism for rotating said shaft in the opposite direction independently of said mechanism, means for releasably holding said shaft against movement in said opposite direction, a ratchet wheel fixed to said shaft, a movable detent member releasably engageable with said ratchet wheel, a stationary stop member, and a stop on said ratchet wheel engageable with said stationary stop member for limiting the movement of said shaft in said opposite direction when said detent is released from the ratchet.

11. Apparatus of the class described comprising manually engageable means movable for testing the strength of the operator of the apparatus, resistance opposed mechanism actuated by said manually engageable means, a dial and a movable pointer to indicate the force applied to said means in the actuation of said mechanism, means for actuating said pointer comprising a rotatable shaft to which said pointer is fixed, means operable under the control of said mechanism for rotating said shaft in one direction, means for rotating said shaft in the opposite direction independently of said mechanism, means for releasably holding said shaft against movement in said opposite direction, a ratchet wheel fixed to said shaft, a movable detent member releasably engageable with said ratchet wheel, a stationary stop member, a stop on said ratchet wheel engageable with said stationary stop member for limiting the movement of said shaft in said opposite direction when said detent is released from the ratchet, and means connected to said shaft operating means for retarding the rotation of said shaft in said opposite direction.

12. Apparatus of the class described comprising a cabinet having mounted therein a member movable from retracted position to projected position, a yieldable resistance opposing the movement of said member to projected position, a rack carried by said member for moving the same, means for projecting said member comprising a rotary shaft and a connection between said shaft and member for moving the latter when the shaft is rotated, said connection comprising a gear in mesh with said rack, a lever fixed to said shaft for rotating the latter, said cabinet having a front horizontal wall portion provided with an opening, a vertically disposed member movably mounted in said cabinet and extending through said opening, and means connecting said vertically disposed member to said shaft operating lever for actuating the latter.

13. Apparatus of the class described comprising a cabinet having mounted therein a member movable from retracted position to projected position, a yieldable resistance opposing the movement of said member to projected position, a rack carried by said member for moving the same, means for projecting said member comprising a rotary shaft and a connection between said shaft and member for moving the latter when the shaft is rotated, said connection comprising a gear in mesh with said rack, a lever for rotating said shaft, said cabinet having a front horizontal wall portion provided with an opening, a vertically disposed member movably mounted in said cabinet and extending through said opening, a horizontally disposed lever pivotally mounted below said opening and having one end connected to said vertically disposed member, and means connecting the other end of said last mentioned lever to said shaft rotating lever for actuating the latter.

14. Apparatus of the class described comprising a cabinet having mounted therein a member movable from retracted position to projected position, a yieldable resistance opposing the movement of said member to projected position, a rack carried by said member for moving the same, means for projecting said member comprising a rotary shaft and a connection between said shaft and member for moving the latter when the shaft is rotated, said connection comprising a gear in mesh with said rack, a lever for rotating said shaft, said cabinet having a front horizontal wall portion provided with an opening, a vertically disposed member movably mounted in said cabinet and extending through said opening, and means connecting said vertically disposed member to said shaft operating lever for actuating the latter to project said first member, and means for retarding the movement of said first member to retracted position.

15. Apparatus of the class described comprising a cabinet having mounted therein a member movable from retracted position to projected position, a yieldable resistance opposing the movement of said member to projected position, a rack carried by said member for moving the same, means for projecting said member comprising a rotary shaft and a connection between said shaft and member for moving the latter when the shaft is rotated, said connection comprising a gear in mesh with said rack, a lever for rotating said shaft, said cabinet having a front horizontal wall portion provided with an opening, a vertically disposed member movably mounted in said cabinet and extending through said opening, a horizontally disposed lever pivotally mounted below said opening and having one end connected to said vertically disposed member, means connecting the other end of said last mentioned lever to said shaft rotating lever for actuating the latter to project said first member, and means connected to said last mentioned means for retarding the movement of said first member to retracted position.

16. Apparatus of the class described comprising a cabinet having mounted therein a member movable from retracted position to projected position, a yieldable resistance opposing the movement of said member to projected position, means for projecting said member comprising a rotary shaft and a connection between said shaft and member for moving the latter when the shaft is rotated, a lever for rotating said shaft, said cabinet having a front horizontal wall portion provided with an opening, a vertically disposed member movably mounted in said cabinet and extending through said opening, means connecting said vertically disposed member to said shaft operating lever for actuating the latter, means mounted in said cabinet for indicating the force exerted in projecting said member, and mechanism operated by said member for actuating said indicating means.

17. Apparatus of the class described comprising a cabinet having mounted therein a member movable from retracted position to projected position, a yieldable resistance opposing the movement of said member to projected position, a rack carried by said member for moving the same, means for projecting said member comprising a rotary shaft and a connection between said shaft and member for moving the latter when the shaft is rotated, said connection comprising a gear in mesh with said rack, a lever for rotating said shaft, said cabinet having a front horizontal wall portion provided with an opening, a vertically disposed member movably mounted in said cabinet and extending through said opening, means connecting said vertically disposed member to said shaft operating lever for actuating the latter, means mounted in said cabinet for indicating the force exerted in projecting said member, and mechanism operated by said member for actuating said indicating means.

WILLIAM RABKIN.